(12) United States Patent
Lee et al.

(10) Patent No.: US 12,441,344 B2
(45) Date of Patent: Oct. 14, 2025

(54) ECO-FRIENDLY VEHICLE AND METHOD OF CONTROLLING THE SAME

(71) Applicants: Hyundai Motor Company, Seoul (KR); Kia Corporation, Seoul (KR)

(72) Inventors: Gyu Ri Lee, Gyeonggi-do (KR); Hui Un Son, Gyeonggi-do (KR); Sung Il Jung, Dongnae-Gu (KR); Do Hwa Kim, Seoul (KR); Sung Bae Jeon, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 146 days.

(21) Appl. No.: 18/077,652

(22) Filed: Dec. 8, 2022

(65) Prior Publication Data
US 2023/0294722 A1 Sep. 21, 2023

(30) Foreign Application Priority Data

Mar. 15, 2022 (KR) .................. 10-2022-0031834

(51) Int. Cl.
*B60W 50/12* (2012.01)
*B60R 25/31* (2013.01)
*B60W 40/08* (2012.01)
*B60W 50/14* (2020.01)

(52) U.S. Cl.
CPC ............ *B60W 50/12* (2013.01); *B60R 25/31* (2013.01); *B60W 40/08* (2013.01); *B60W 50/14* (2013.01)

(58) Field of Classification Search
CPC ...... B60W 50/12; B60W 40/08; B60W 50/14; B60R 25/31

USPC ............................................. 701/36
See application file for complete search history.

(56) References Cited

U.S. PATENT DOCUMENTS

| | | | |
|---|---|---|---|
| 2017/0080900 A1* | 3/2017 | Huennekens | G05D 1/0088 |
| 2019/0259044 A1* | 8/2019 | Kawashima | G07C 5/085 |
| 2020/0023811 A1* | 1/2020 | Herman | B60R 25/01 |
| 2020/0394746 A1* | 12/2020 | Krishnamurthy | G06V 20/56 |
| 2021/0043087 A1* | 2/2021 | Mezaael | G08G 1/202 |
| 2021/0183221 A1* | 6/2021 | Fu | G08B 13/19613 |

FOREIGN PATENT DOCUMENTS

CN 107121952 A * 9/2017 ....... B60R 21/01512

OTHER PUBLICATIONS

Zhixiong Liu, A vehicle anti-theft and alarm system based on computer vision, Oct. 16, 2005, IEEE International Conference on Vehicular Electronics and Safety 2005 (Year: 2005).*

* cited by examiner

*Primary Examiner* — Matthias S Weisfeld
(74) *Attorney, Agent, or Firm* — Fox Rothschild LLP

(57) ABSTRACT

Disclosed is a method of controlling an eco-friendly vehicle, the method including determining whether the vehicle may be in valet mode, when the vehicle may be determined to be in valet mode, generating the weight of an object by sensing the object riding in the vehicle using a plurality of indoor sensors disposed in the vehicle, performing comparative analysis on the generated weight of the object with a predetermined vehicle reference weight, and differentiating limiting conditions for the vehicle or outputting a notification signal based on the result of the comparative analysis.

15 Claims, 6 Drawing Sheets

ECO-FRIENDLY VEHICLE AND METHOD OF CONTROLLING THE SAME

CROSS-REFERENCE TO RELATED APPLICATIONS

This application claims under 35 U.S.C. § 119(a) the benefit of Korean Patent Application No. 10-2022-0031834, filed on Mar. 15, 2022, which is hereby incorporated by reference as if fully set forth herein.

TECHNICAL FIELD

The present disclosure relates to an eco-friendly vehicle capable of sensing the weight of an object riding in the vehicle, determining whether the weight of the object changes while driving or parking or stopping the vehicle based on the sensed weight, and restricting the function of the vehicle based on the determination, and a method of controlling the same.

BACKGROUND

Valet mode refers to a function that allows a vehicle owner to restrict some functions of the vehicle before delivering the vehicle to another person when someone other than the owner temporarily drives the vehicle, such as using a valet parking service.

Generally, the valet mode may be implemented in the form of recording traveling distance, time, and maximum speed of the vehicle until an engine may be turned off and informing the vehicle owner of the recorded information through a smartphone application, or informing the vehicle owner of the recorded information through an in-vehicle output device when the vehicle owner turns off the valet mode. In addition to the method of informing the driver of traveling history of the vehicle recorded in the absence of the driver, in order to protect personal information of the owner, some functions of an audio/video/navigation (AVN) system may be restricted (e.g., locking of navigation destination setting history, disabling access to driver's profile, limiting wireless connection function, etc.). In addition, when the valet mode may be activated, access to a predetermined space in the vehicle may be restricted, such as locking a trunk or glove box, and engine output or RPM may also be restricted depending on the vehicle.

In the above-mentioned valet mode, because only traveling distance, time, maximum speed of the vehicle, etc. may be recorded until the engine may be turned off, the system is incapable of checking the number of additional passengers other than a valet driver, and minimizing anxiety created from potential theft of items inside the vehicle.

SUMMARY

Accordingly, the present disclosure may be directed to a vehicle and a method of controlling the same that substantially obviate one or more problems due to limitations and disadvantages of the current technology.

An object of the present disclosure may be to provide a vehicle capable of sensing the weight of an object riding in the vehicle, determining whether the weight of the object changes while driving or parking or stopping the vehicle based on the sensed weight, and restricting the function of the vehicle based on the determination, and a method of controlling the same.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, provided is a method of controlling a vehicle, the method including generating a weight of an object by sensing the object riding in the vehicle using a plurality of indoor sensors disposed in the vehicle, performing comparative analysis on the generated weight of the object with a predetermined vehicle reference weight, and differentiating limiting conditions for the vehicle or outputting a notification signal based on the result of the comparative analysis.

The generating may include, when motion may be detected from the object riding in the vehicle, determining that the object may be a user riding in the vehicle and calculating a first weight for the user, when motion may not be detected from the object riding in the vehicle, determining that the object may be an item loaded onto the vehicle and calculating a second weight for the item, and generating a weight of the object by using the calculated first and/or second weights.

The performing comparative analysis may include setting the predetermined vehicle reference weight differently in consideration of the first weight or the second weight, when the first weight in the generated weight of the object may be greater than the second weight, setting the predetermined vehicle reference weight based on a seating capacity, or when the second weight in the generated weight of the object may be greater than the first weight, setting the predetermined vehicle reference weight based on a load capacity.

The performing may include, when the weight of the object may be greater than the predetermined vehicle reference weight as a result of the comparative analysis, outputting a notification signal recognizable by a driver of the vehicle, or performing limiting on the vehicle by selection of the driver of the vehicle.

In another embodiment of the present disclosure, provided may be a method of controlling an eco-friendly vehicle, the method including determining whether the vehicle may be in valet mode, when the vehicle may be determined to be in valet mode, generating a weight of an object by sensing the object riding in the vehicle using a plurality of indoor sensors disposed in the vehicle, performing comparative analysis on the generated weight of the object with a predetermined vehicle reference weight, and differentiating limiting conditions for the vehicle or outputting a notification signal based on the result of the comparative analysis.

The generating may include, in activation of the valet mode, when motion may be detected from the object riding in the vehicle, determining that the object may be a user riding in the vehicle and calculating a first weight for the determined user, when motion may not be detected from the object riding in the vehicle, determining that the object may be an item loaded onto the vehicle and calculating a second weight for the determined item, and generating a weight of the object by using the first and/or second weights.

The performing comparative analysis may include setting the predetermined vehicle reference weight differently in consideration of the first weight or the second weight, when the first weight in the generated weight of the object may be greater than the second weight, setting the predetermined vehicle reference weight based on a seating capacity, or when the second weight in the generated weight of the object may be greater than the first weight, setting the predetermined vehicle reference weight based on a load capacity.

The performing may include, when the weight of the object may be greater than the predetermined vehicle reference weight as a result of the comparative analysis, determining that a plurality of people has boarded the vehicle and outputting a notification signal recognizable by a driver of the vehicle, and blocking starting of the vehicle by selection of a driver of the vehicle.

The performing may include, determining that the second weight has changed and when the second weight has reduced and then returned to the second weight before reduction, determining that the item has been moved, and when the second weight has reduced and then may not be returned to the second weight before reduction, determining that the item has been stolen.

In another embodiment of the present disclosure, provided may be a computer-readable recording medium for recording a program for executing the method of controlling an eco-friendly vehicle as described herein.

In another embodiment of the present disclosure, provided may be an eco-friendly vehicle provided with a control unit for detecting weight change, wherein the control unit includes a calculator configured to sense an object riding in the vehicle using a plurality of indoor sensors disposed in the vehicle so as to generate a weight of the object, a determinator configured to perform comparative analysis on the generated weight of the object with a predetermined vehicle reference weight, and a controller configured to differentiate limiting conditions for the vehicle or output a notification signal based on the result of the comparative analysis.

The calculator may be configured, when motion may be detected from the object riding in the vehicle, to determine that the object may be a user riding in the vehicle and calculate a first weight for the determined user, when motion may not be detected from the object riding in the vehicle, determine that the object may be an item loaded onto the vehicle and calculate a second weight for the determined item, and generate a weight of the object by using the calculated first and second weights.

The determinator may set the predetermined vehicle reference weight differently in consideration of the first weight or the second weight, when the first weight in the generated weight of the object may be greater than the second weight, set the predetermined vehicle reference weight based on a seating capacity, or when the second weight in the generated weight of the object may be greater than the first weight, set the predetermined vehicle reference weight based on a load capacity.

The controller may, when the weight of the object may be greater than the predetermined vehicle reference weight as a result of the comparative analysis, output a notification signal recognizable by a driver of the vehicle, or perform limiting on the vehicle by selection of the driver of the vehicle.

In another embodiment of the present disclosure, provided may be an eco-friendly vehicle provided with a valet control unit for controlling a valet mode, wherein the valet control unit includes a valet determinator configured to determine whether the vehicle may be in the valet mode, a calculator, when the vehicle may be determined to be in the valet mode, configured to sense an object riding in the vehicle using a plurality of indoor sensors disposed in the vehicle so as to generate a weight of the object to obtain a generated weight, a change determinator configured to perform comparative analysis on the generated weight of the object with a predetermined vehicle reference weight, and a valet controller configured to differentiate limiting conditions for the vehicle or output a notification signal based on a result of the comparative analysis.

The calculator may, in activation of the valet mode, when motion may be detected from the object riding in the vehicle, determine that the object may be a user riding in the vehicle and calculate a first weight for the user, when motion may not be detected from the object riding in the vehicle, determine that the object may be an item loaded onto the vehicle and calculate a second weight for the determined item, and generate a weight of the object by using the first and/or second weights.

The change determinator may be configured to set the predetermined vehicle reference weight differently in consideration of the first weight or the second weight, when the first weight in the generated weight of the object may be greater than the second weight, set the predetermined vehicle reference weight based on a seating capacity, or when the second weight in the generated weight of the object may be greater than the first weight, set the predetermined vehicle reference weight based on a load capacity.

The valet controller may be configured, when the weight of the object may be greater than the predetermined vehicle reference weight as a result of the comparative analysis, to determine that a plurality of people has boarded the vehicle and output a notification signal recognizable by a driver of the vehicle, and block starting of the vehicle by selection of a driver of the vehicle.

The valet controller may be configured to determine that the second weight has changed and, when the second weight has reduced and then returned to the second weight before reduction, to determine that the item has been moved, and when the second weight has reduced and then may not be returned to the second weight before reduction, determine that the item has been stolen.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
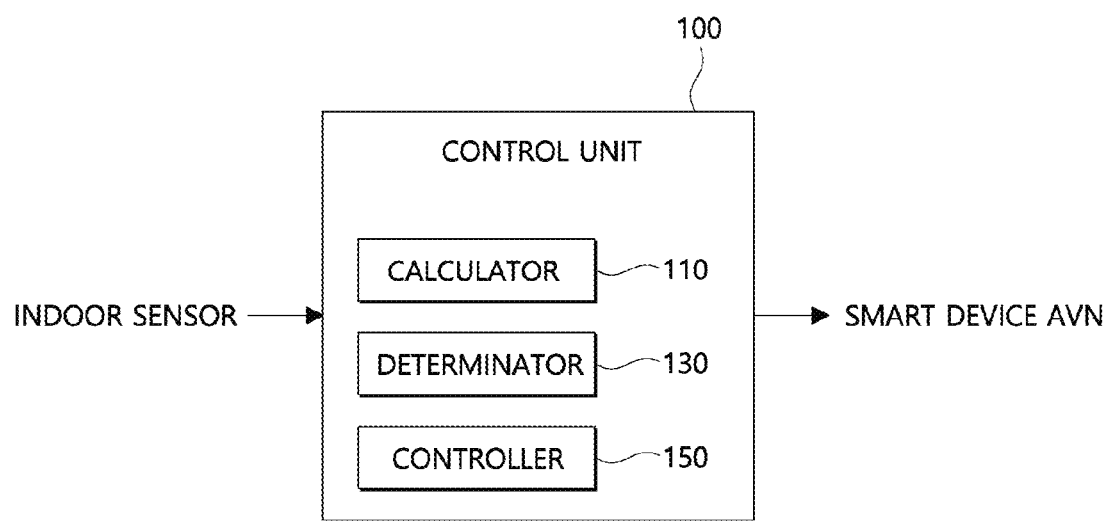
FIG. 1 is a block diagram illustrating an example of the structure of a control unit provided in an eco-friendly vehicle according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. These terms are merely intended to distinguish one component from another component, and the terms do not limit the nature, sequence or order of the constituent components. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor and is specifically programmed to execute the processes described herein. The memory is configured to store the modules and the processor is specifically configured to execute said modules to perform one or more processes which are described further below.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about".

Hereinafter, embodiments of the present disclosure will be described in detail with reference to the accompanying drawings, the same reference numerals may be used to designate the same/like components, and a redundant description thereof will be omitted. In general, a suffix such as "module" and "unit" may be used to refer to elements or components. Use of such a suffix herein may be merely intended to facilitate description of the specification, and the suffix itself may not be intended to have any special meaning or function. In describing the present disclosure, if a detailed explanation of a related known function or construction may be considered to unnecessarily distract from the gist of the present disclosure, such explanation, which would be obvious to those skilled in the art, has been omitted. The accompanying drawings may be used only to help easily understand the technical idea of the present disclosure, and it should be understood that the idea of the present disclosure may not be limiting by the accompanying drawings. The idea of the present disclosure should be construed to encompass any alterations, equivalents and substitutes beyond what may be shown in the accompanying drawings.

It will be understood that, although the terms first, second, etc. may be used herein to describe various elements, these elements should not be limiting by these terms. These terms may be generally used to distinguish one element from another.

It will be understood that, when an element may be referred to as being "connected to" another element, the element may be directly connected to the other element or intervening elements may also be present. In contrast, when an element may be referred to as being "directly connected to" another element, there may be no intervening elements present.

A singular representation may include a plural representation unless it represents a definitely different meaning from the context.

Terms such as "include" or "has" may be used herein and it should be understood that the terms may be intended to indicate the existence of several components, functions or steps, disclosed in the specification, and it may be also to be understood that greater or fewer components, functions, or steps may likewise be utilized. In addition, "control unit" included in the name of a motor control unit (MCU), a hybrid control unit (HCU), etc. may be a term widely used in naming a controller that controls a specific function of a vehicle, and does not mean a generic functional unit. For example, each control unit may include a communication device configured to communicate with another control unit or sensor so as to control the function it may be responsible for, a memory configured to store an operating system or logic commands, input and output information, etc., and one or more processors configured to perform judgment, calculation, decision, etc. needed in controlling the function it may be responsible for.

In the embodiments of the present disclosure, it may be proposed to sense the weight of an object riding in an eco-friendly vehicle, and based on the sensed weight, control the eco-friendly vehicle according to whether the weight of the object changes during driving or parking.

In addition, in the embodiments of the present disclosure, it may be proposed to sense the weight of an object riding in an eco-friendly vehicle when activating a valet mode, and based on the sensed weight, control the eco-friendly vehicle according to whether the weight of the object changes during the valet mode.

"Valet mode" referred to below may mean a mode in which at least some settings of a vehicle may be changed or at least some functions may be restricted on the assumption that an owner, a main driver, or a driver who has driven the vehicle to a predetermined area, where the driver may be expected to be replaced, will be replaced by another driver.

FIG. 1 may be a block diagram illustrating an example of the structure of a control unit provided in an eco-friendly vehicle according to an embodiment of the present disclosure.

Referring to FIG. 1, a control unit 100 according to an embodiment of the present disclosure is provided inside the eco-friendly vehicle. The control unit 100 may control at least one or more indoor sensors disposed in the eco-friendly vehicle so as to sense the weight of an object riding in the vehicle.

The control unit 100 may perform comparative analysis on the weight of the sensed object with a predetermined reference weight so as to control the eco-friendly vehicle to apply different limiting conditions based on the result of the analysis.

Meanwhile, the control unit 100 may include a calculator 110, a determinator 130, and a controller 150.

In implementation, because the control unit 100 applicable to the embodiments may control a powertrain based on its level, the control unit 100 may be implemented as a higher-level control unit 100 having an integrated control function for the powertrain, such as a vehicle control unit (VCU) 100 in an electric vehicle (EV), a hybrid control unit (HCU) in a hybrid vehicle, and the like, but may not be necessarily limited thereto.

Hereinafter, each component of the control unit 100 will be described in more detail.

First, the calculator 110 may be configured to sense an object riding in the eco-friendly vehicle using a plurality of indoor sensors disposed in the eco-friendly vehicle so as to generate or calculate the weight of the object. For example, the plurality of indoor sensors may include a sitting sensor, a motion sensor, and the like.

When motion may be detected from an object riding in the eco-friendly vehicle under the control of the control unit 100, the calculator 110 may be configured to determine that the object may be a user riding in the eco-friendly vehicle. The calculator 110 may be configured to calculate the object determined to be a user as a first weight. The user may be referred to as a driver, a passenger, or a vehicle owner.

On the other hand, when motion may not be detected from the object riding in the eco-friendly vehicle under the control of the controller 100, the calculator 110 may be configured to determine that the object may be an item loaded onto the eco-friendly vehicle. The calculator 110 may be configured to calculate the object determined to be an item as a second weight.

The calculator 110 may be configured to generate the weight of the object by using the calculated first and/or second weights. For example, the weight of the object may be a sum of the first weight and the second weight.

The determinator 130 may be configured to perform comparative analysis on the generated weight of the object with a predetermined vehicle reference weight. For example, the vehicle reference weight may include a total vehicle weight. The total vehicle weight may be the weight of a vehicle in a maximum loaded state. In other words, the total vehicle weight may mean the weight of a vehicle occupied up to a seating capacity or loaded with a maximum load capacity.

The determinator 130 may be configured to perform comparative analysis on a predetermined vehicle reference weight in consideration of the weight of the object, but may be configured to perform comparative analysis on the predetermined vehicle reference weight differently depending on the first weight or the second weight. For example, when the first weight may be greater than the second weight, the determinator 130 may be configured to perform comparative analysis focusing on the seating capacity in the predetermined vehicle reference weight. When the second weight may be greater than the first weight, the determinator 130 may be configured to perform comparative analysis focusing on the maximum load capacity in the predetermined vehicle reference weight.

The determinator 130 may be configured to more accurately perform comparative analysis on the change in the weight of an object by differently applying the vehicle reference weight depending on the weight of the object under the control of the control unit 100.

However, the present disclosure may not be limited thereto. The determinator 130 may be configured to receive various data from at least one or more sensors disposed in the eco-friendly vehicle under the control of the control unit 100 and set a predetermined vehicle reference weight based thereon.

In addition, when the eco-friendly vehicle is being parked or when weight change or motion may be sensed inside the eco-friendly vehicle using the sitting sensor or the motion sensor, the determinator 130 may be configured to determine that an issue has occurred in the vehicle, generate warning data, and provide the warning data to the controller 150.

Based on the result of the comparative analysis, the controller 150 may be configured to differentiate the limiting condition for the eco-friendly vehicle or transmit a notification signal to a mobile device connected to the eco-friendly vehicle through wireless communication.

For example, when the weight of an object may be greater than the predetermined vehicle reference weight, the controller 150 may be configured to output a notification signal containing the information or transmit the same to a mobile device so as to notify a driver of the eco-friendly vehicle of the information.

When the seating capacity exceeds the predetermined vehicle reference weight, the controller 150 may be configured to output a notification signal using an output device installed in the eco-friendly vehicle. The output device may be a speaker or a display. For example, the speaker may output a message such as "The seating capacity has been exceeded" or "Some functions may be restricted due to excess seating capacity" under the control of the controller

150. The display may be configured to display a message about the excess seating capacity or display a description of a function restricted due to the excess seating capacity, under the control of the controller 150.

In addition, when the notification signal may be transmitted from the eco-friendly vehicle, the mobile device may display a message regarding the notification signal through a pop-up, and continue to maintain the pop-up until the driver recognizes the notification signal. The mobile device may include a smartphone, a smart device, a smart pad, a smartwatch, and the like.

When the weight of the object may be greater than the predetermined vehicle reference weight, the controller 150 may be configured to restrict some functions of the eco-friendly vehicle. For example, when the weight of the object may be greater than predetermined vehicle reference weight, the controller 150 may be configured to determine that the number of users or passengers may be greater than the seating capacity, and may restrict starting of the eco-friendly vehicle or limit the maximum speed of the eco-friendly vehicle.

When a valet mode may be activated, the above-described controller 150 may be configured to set the weight of the vehicle in the valet mode (valet mode weight) to be lower than the predetermined vehicle reference weight. The valet mode weight may be set as an average weight of one normal adult male.

For example, when the weight of the vehicle exceeds the predetermined vehicle reference weight in the state in which the valet mode may be activated, the controller 150 may be configured to determine that persons other than the valet driver have boarded the vehicle. Thereafter, the controller 150 may be configured to transmit a notification signal to a mobile device so that the driver of the eco-friendly vehicle may recognize the notification signal indicating the excess weight of the valet mode vehicle. Details of this will be described later.

In addition, when warning data may be transmitted from the determinator 130, the controller 150 may be configured to capture the exterior and interior of the eco-friendly vehicle with at least one or more cameras disposed in the eco-friendly vehicle, and store the captured image.

The controller 150 may be configured to generate a warning message based on the warning data and the captured image and may transmit the generated warning message to the mobile device of the driver (or the owner of the eco-friendly vehicle) so as to notify the driver (or the owner of the eco-friendly vehicle) that an issue has occurred in the eco-friendly vehicle. The warning message may be referred to as a notification signal.

In addition, when warning data may be transmitted from the determinator 130, the controller 150 may be configured to sense the indoor air of the eco-friendly vehicle using at least one or more indoor sensors disposed in the eco-friendly vehicle, and when the quality of the sensed indoor air of the eco-friendly vehicle may be worse than the predetermined standard quality of indoor air, the controller 150 may be configured to activate the air conditioning function and, in some cases, may circulate the indoor air of the eco-friendly vehicle by partially opening a window.

Figure 2:
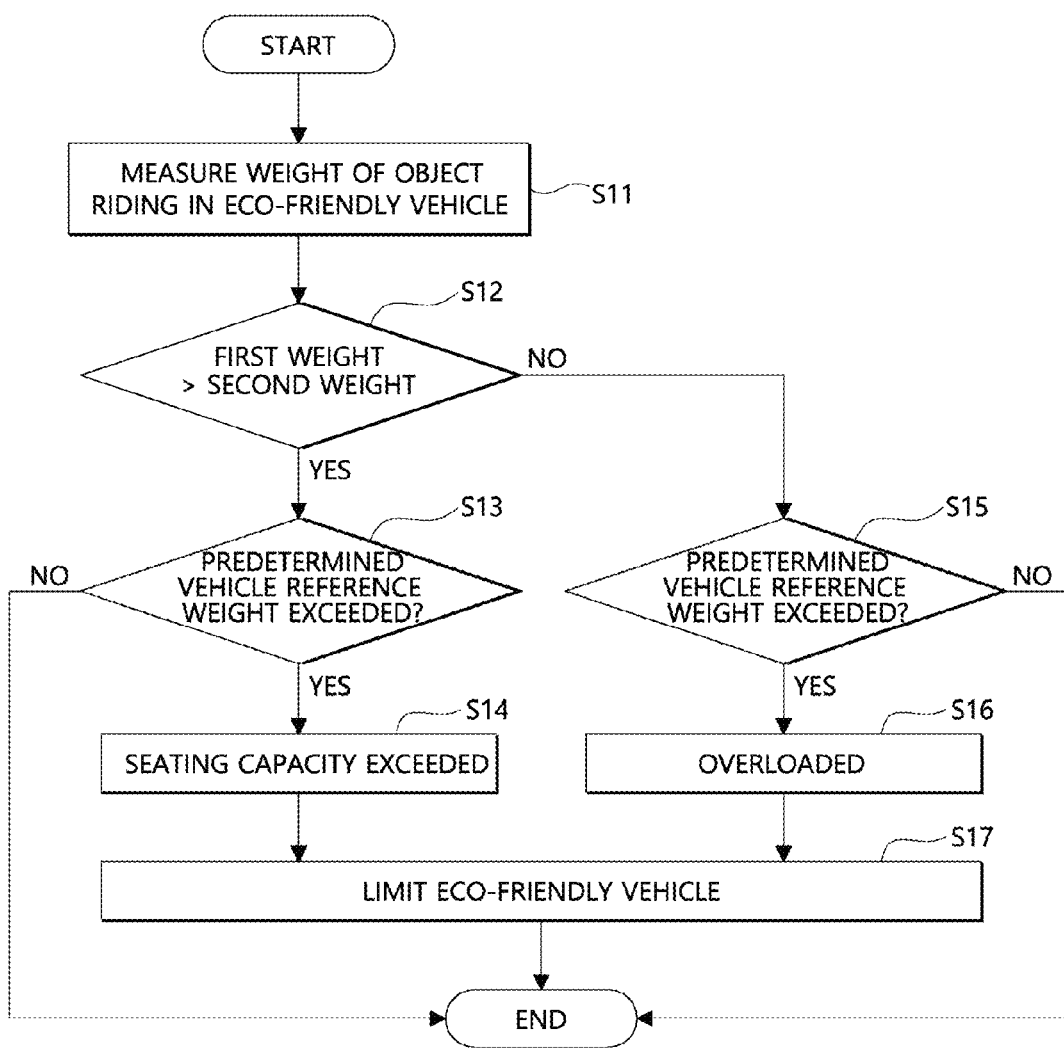
FIG. 2 is a flowchart showing an example of a control process for limiting an eco-friendly vehicle according to a change in the weight of an object riding in the eco-friendly vehicle according to an embodiment of the present disclosure.

FIG. 2 is a flowchart showing an example of a control process for limiting an eco-friendly vehicle according to a change in the weight of an object riding in the eco-friendly vehicle according to an embodiment of the present disclosure.

Referring to FIG. 2, a control process for limiting an eco-friendly vehicle according to a change in weight according to an embodiment of the present disclosure is as follows.

First, the present disclosure may include sensing an object riding in the eco-friendly vehicle using a plurality of indoor sensors disposed in the eco-friendly vehicle and generating the weight of the object in step S11. For example, the plurality of indoor sensors may include a sitting sensor, a motion sensor, and the like.

The generating may include, when motion is detected from an object riding in the eco-friendly vehicle, determining that the object is a user riding in the eco-friendly vehicle. When the object is determined to be a user, calculating a first weight for the user may be performed in step S12.

When motion is not detected from the object riding in the eco-friendly vehicle, the calculator 110 may determine that the object is an item loaded onto the eco-friendly vehicle. When the object is determined to be an item, calculating a second weight for the determined item may be performed in step S12.

In the present disclosure, the weight of the object may be generated using the calculated first and second weights.

Thereafter, the present disclosure may include performing comparative analysis on the generated weight of the object with a predetermined vehicle reference weight in steps S13 and S15. For example, the vehicle reference weight may include a total vehicle weight. The total vehicle weight may be the weight of a vehicle in a maximum loaded state. In other words, the total vehicle weight may mean the weight of a vehicle occupied up to a seating capacity or loaded with a maximum load capacity.

The present disclosure may perform comparative analysis on the predetermined vehicle reference weight, but may perform the analysis differently depending on whether the comparison target is the first weight or the second weight in steps S13 and S15. For example, when the first weight is greater than the second weight, comparative analysis may be performed focusing on the seating capacity in the predetermined vehicle reference weight in step S13.

In the present disclosure, when the first weight exceeds the predetermined vehicle reference weight, it may be determined to be excess seating capacity in step S14.

On the other hand, when the second weight is greater than the first weight, comparative analysis may be performed focusing on the maximum load capacity in the predetermined vehicle reference weight in step S15.

In the present disclosure, when the second weight exceeds the predetermined vehicle reference weight, it may be determined that the vehicle is overloaded in step S16.

Thereafter, the present disclosure may include, based on the result of the comparative analysis, differentiating the limiting condition for the eco-friendly vehicle or outputting a notification signal in step S17.

For example, when the first weight is greater than the predetermined vehicle reference weight, the present disclosure may output a notification signal containing the information or transmit the same to a mobile device so as to notify a driver of the eco-friendly vehicle of the information. In other words, when excess seating capacity occurs, the present disclosure may output a notification signal using an output device installed in the eco-friendly vehicle. The output device may be a speaker or a display.

For example, the present disclosure may output a message such as "The seating capacity has been exceeded" or "Some functions are restricted due to excess seating capacity" through a speaker, or may display a message about the excess seating capacity or a description of a function restricted due to excess seating capacity through a display.

In addition, when the second weight is greater than the predetermined vehicle reference weight, the present disclosure may restrict some functions of the eco-friendly vehicle. For example, in the present disclosure, upon overloading, a notification signal may be output using an output device installed in the eco-friendly vehicle. The output device may be a speaker or a display.

For example, the present disclosure may output a message such as "The vehicle is currently overloaded" or "Some functions of the eco-friendly vehicle are restricted due to overload" through a speaker, or may display a message about the overload or a description of a function restricted due to the overload through a display. However, the present disclosure is not limited thereto, and may be expressed in various embodiments.

Figure 3:
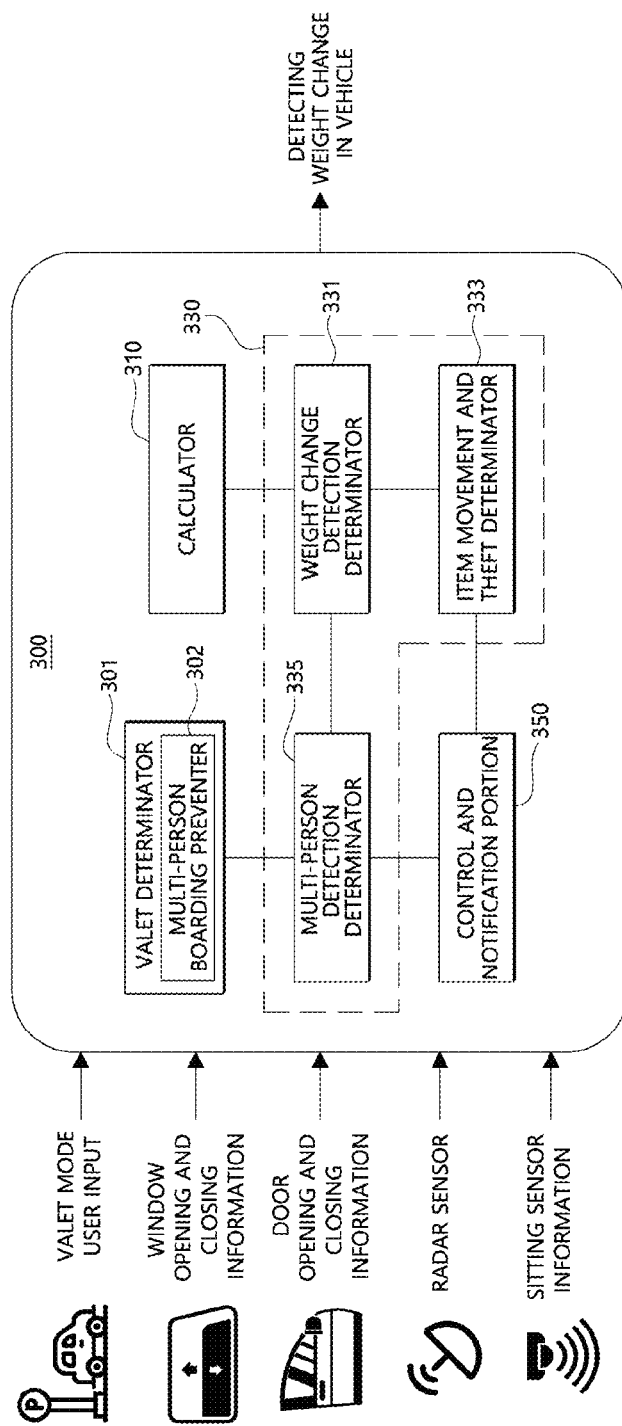
FIG. 3 is a block diagram showing an example of the structure of a valet control unit for detecting weight change during a valet mode according to another embodiment of the present disclosure.

FIG. 3 is a block diagram showing an example of the structure of a valet control unit for detecting weight change during a valet mode according to another embodiment of the present disclosure.

Referring to FIG. 3, a valet control unit 300 configured to detect weight change in the valet mode may have valet mode information, window opening and closing information, door opening and closing information, radar information, sitting sensor information, etc. as input information.

In addition, output information may include a control command, related to the weight change and the power limiting function in the valet mode in the eco-friendly vehicle, transmitted to another control unit.

Valet mode information may be obtained by the audio/video/navigation (AVN) system. The audio/video/navigation (AVN) system may receive various input information from the owner or main user using a user setting menu (USM), and display various valet mode information related to the valet mode.

When at least one of predetermined conditions to enable valet mode may be satisfied, it may be determined to activate a valet mode function. For example, the predetermined conditions to enable valet mode may include that a command for enabling the valet mode may be manually entered by a vehicle owner through the AVN system or the user setting menu (USM), that a command for enabling the valet mode may be input by remote control using wireless communication (e.g., a command may be transmitted via a telematics system, or a command may be input from a mobile terminal connected through near field communication such as Wi-Fi or Bluetooth, etc.), that a door sensor detects that a driver's seat door may be opened or closed, and a seat sensor senses that a driver's weight may be different from a vehicle owner's weight (i.e., a change of driver may be detected), that a navigation system detects that the vehicle has reached a predetermined location (e.g., an airport, hotel, restaurant, parking lot, or location determined by the navigation system to be a valet area, a location predetermined by a driver, etc.), that the vehicle arrives at a predetermined location set based on big data (e.g., driver's past setting history, other drivers' setting histories, etc.) learned by the navigation system or linked to a telematics center, that a parking assist system (PAS) may be activated (the parking assist system may include, but may not be limited to, a smart parking assist system (SPAS), a remote parking assist system (RPAS), etc.), and that the vehicle may be determined to be in parking lot mode through internal logic based on sensor information of the vehicle (e.g., automated parking system (APS), backup parking system (BPS) operation analysis, etc.).

The window opening and closing information may be provided using at least one or more window sensors. For example, the at least one or more window sensors may be disposed in a driver's seat window, a passenger seat window, and a plurality of rear seat windows, respectively, and when opening and closing of these windows may be detected, the window sensors may provide window opening and closing information to the valet control unit 300.

The door opening and closing information may be provided using at least one or more door sensors. For example, the at least one or more door sensors may be disposed in a driver's seat door, a passenger seat door, and a plurality of rear seat doors, respectively, and when opening and closing of these doors may be detected, the door sensors may provide door opening and closing information to the valet control unit 300.

The radar information may be provided using at least one or more radar sensors disposed in the eco-friendly vehicle.

The sitting sensor information may be provided using at least one or more sitting sensors each installed on a corresponding one of seats. For example, the at least one or more sitting sensors may be disposed in a driver's seat, a passenger seat, at least one or more rear seats, and the like, respectively, and when weight may be sensed, the sitting sensors may provide sitting sensor information for the weight to the valet control unit 300. Upon receiving the sitting sensor information, the valet control unit 300 may store the information by classifying or dividing the same depending on the seat and time. For example, when the weight of a driver measured by the sitting sensor may be changed, the valet control unit 300 may detect that the driver has been changed.

In addition, user input may be input through a command input tool provided in the vehicle, for example, a dial, a key button, a touch button, a touchscreen, etc., or may be transmitted via the telematics center through manipulation of an application installed in a smart device of a vehicle owner or a user, depending on the structure of the vehicle. The smart device may include, but may not be limited to, a smartphone, a smart terminal, a mobile phone, a mobile device, a mobile terminal, and the like.

The source of each of the above-described input information may be described based on the initial source of the information, which may be information that may be transmitted to the valet control unit 300 via another control unit 100 or that has been processed by being filtered by another control unit 100, depending on the structure of the vehicle.

Meanwhile, the valet control unit 300 may include a valet determinator 301, a calculator 310, a change determinator 330, and a valet controller 350. The valet control unit 300 may be referred to as a valet mode control unit 100.

In implementation, because the valet control unit 300 applicable to the embodiments may control a powertrain depending on its level, the valet control unit 100 may be implemented as a higher-level control unit having an integrated control function for the powertrain, such as a vehicle control unit (VCU) in an electric vehicle (EV), a hybrid control unit (HCU) in a hybrid vehicle, and the like, but may not be necessarily limited thereto.

Hereinafter, each component of the valet control unit 300 will be described in more detail.

First, the valet determinator 301 may be configured to determine whether at least one of predetermined conditions to enable valet mode may be satisfied under the control of the valet control unit 300, and decide to activate the valet mode function when the conditions may be satisfied.

Examples of the predetermined conditions to enable the valet mode may be as follows, but may not be necessarily limited thereto.

- A command for enabling valet mode may be manually entered by a vehicle owner through the AVN system or the user setting menu (USM).
- A command for enabling valet mode may be input by remote control using wireless communication (e.g., a command may be transmitted via a telematics system, or a command may be input from a mobile terminal connected through near field communication such as Wi-Fi or Bluetooth, etc.).
- A door sensor detects that a driver's seat door may be opened or closed, and a seat sensor senses that a driver's weight may be different from a vehicle owner's weight (i.e., a change of driver may be detected).
- A navigation system detects that the vehicle has reached a predetermined location (e.g., an airport, hotel, restaurant, parking lot, or location determined by the navigation system to be a valet area, a location predetermined by a driver, etc.).
- The vehicle arrives at a predetermined location set based on big data (e.g., big data may be a driver's past setting history, other drivers' setting histories, etc.) learned by the navigation system or linked to a telematics center.
- A device that has been previously registered through Bluetooth changes to a non-connected state.
- A parking assist system (PAS) may be activated (the parking assist system may include, but may not be limited to, a smart parking assist system (SPAS), a remote parking assist system (RPAS), etc.).
- The vehicle may be determined to be in parking lot mode through internal logic based on sensor information of the vehicle (e.g., APS, BPS operation analysis, etc.).

In addition, the valet determinator 301 may include a preventer 302 configured to prevent a plurality of people from riding in the vehicle while the valet mode may be activated. The preventer may be referred to as a multi-person boarding preventer 302.

When the valet mode may be activated, the preventer 302 may be configured to set a preventing function for preventing boarding of persons other than the valet driver under the control of the valet control unit 300. For example, when the valet mode may be activated, the preventer 302 may perform one or more of the following restricting functions.

- Automatic setting of turn unlock (e.g., two taps to unlock all)
- When sitting may not be detected, wearing a seat belt may be restricted (e.g., a seat belt may be fastened in advance and no person may be allowed to ride on the seat).
- Automatic setting of child lock
- Automatic setting of rear seat passenger notifications
- When a door other than the door of the driver's seat may be opened, the door may be automatically locked and Blue Link notification may be activated.

Next, when the vehicle may be determined to be in valet mode, the calculator 310 may be configured to sense the object riding in the eco-friendly vehicle using the plurality of indoor sensors disposed in the eco-friendly vehicle so as to generate or calculate the weight of the object. For example, the plurality of indoor sensors may include a plurality of window sensors, a plurality of door sensors, and a plurality of motion sensors. The calculator 310 may be referred to as a valet calculator 310.

When motion recognition information may be transmitted from at least one or more motion sensors under the control of the valet control unit 300, the calculator 310 may be configured to determine that the object may be a user riding in the eco-friendly vehicle. However, the present disclosure may not be limited thereto, and the calculator 310 may be configured to determine whether the object may be a person or an item by using door opening and closing information provided from the door sensor or window opening and closing information provided from the window sensor under the control of the valet control unit 300.

The calculator 310 may be configured to calculate the object determined to be a user as a first weight. The user may be referred to as a driver, a passenger, or a vehicle owner.

On the other hand, when motion may not be detected from the object riding in the eco-friendly vehicle under the control of the valet controller 300, the calculator 310 may be configured to determine that the object may be an item loaded onto the eco-friendly vehicle. The calculator 310 may be configured to calculate the object determined to be an item as a second weight.

The calculator 310 may generate the weight of the object by using the calculated first and/or second weights. For example, the weight of the object may be a sum of the first weight and the second weight.

Thereafter, the change determinator 330 may be configured to perform comparative analysis on the generated weight of the object with a predetermined vehicle reference weight. For example, the vehicle reference weight may include a total vehicle weight. The total vehicle weight may be the weight of a vehicle in a maximum loaded state. In other words, the total vehicle weight may mean the weight of a vehicle occupied up to a seating capacity or loaded with a maximum load capacity.

The change determinator 330 may include a first determinator 331 to a third determinator 335.

The first determinator 331 may be configured to determine whether at least one of the predetermined weight change conditions may be satisfied during the valet mode, and when the condition may be satisfied, the first determinator 331 may be configured to determine that the weight is changed. The first determinator 331 may be referred to as a weight change detection determinator 331. Examples of predetermined weight change conditions may be as follows, but may not be necessarily limited thereto.

- After the valet mode may be activated, a change in the weight of an item may be detected using sitting sensors.
- When a predetermined weight has increased or reduced from the weight of the item calculated at the time of starting valet mode, it may be determined that the weight of the item has changed.

The first determinator 331 may be configured to store the weight of the item calculated or generated at the time when the valet mode may be activated under the control of the valet control unit 300. In other words, the first determinator 331 may determine a change in the weight of an object based on the weight of the object generated when the valet mode may be activated.

When a predetermined weight has reduced from the weight of the item at the time of starting valet mode, the first determinator 331 may be configured to store the weight of the item before the predetermined weight has reduced.

The second determinator 333 may be configured to determine whether at least one of the predetermined item change conditions may be satisfied during the valet mode, and when the condition may be satisfied, the second determinator 333 may be configured to determine that the item has been moved or stolen. The second determinator 333 may be referred to as an item movement and theft determinator 333.

Examples of predetermined item change conditions may be as follows, but may not be necessarily limited thereto.

When the weight has increased and the weight may be equal to or less than a threshold weight value at which it may be determined that a person may be seated, it may be determined that an item may be added.

When the weight has reduced and the weight may be equal to or less than a threshold weight value at which it may be determined that a person has exited the vehicle, it may be determined that an item has been moved.

When the weight has increased or reduced, it may be determined that an item may be added or moved by referring to stoppage information, or door opening and closing information. (When the weight on a seat has increased without stoppage or opening and closing of a door, it may be determined that an item, not a person, may be put on the seat.)

When the weight has reduced, the weight of the item before reduction may be stored or remembered, and after a predetermined period of time, when the weight of the item has increased and the weight of the item returns to the weight before reduction, it may be determined that the item may be placed in its place (e.g., the weight changes from 50 kg, the weight immediately after entering valet mode, to 30 kg, the weight estimated that an item may be dropped, and then to 50 kg, the weight before reduction).

When an item weight on one seat has reduced and an item weight substantially the same as the item weight on the one seat has increased on another seat, it may be determined that the item has been moved between seats.

The weight immediately after entering the valet mode, the weight at the end of the valet mode, the weight moved between seats, the estimated weight of the vehicle, etc. may be compared to determine whether an item has been stolen.

The third determinator 335 may be configured to determine whether at least one of predetermined conditions on change in number of persons may be satisfied during the valet mode, and when the condition may be satisfied, the third determinator 335 may be configured to determine that the number of persons may be plural. The third determinator 335 may be referred to as a multi-person detection determinator 335. Examples of predetermined conditions on change in number of persons may be as follows, but may not be necessarily limited thereto.

When the weight has increased and the weight may be equal to or greater than a threshold weight value at which it may be determined that a person may be seated, it may be determined that multiple persons may be detected to be on board.

When the weight has reduced and the weight may be equal to or greater than a threshold weight value at which it may be determined that a person has exited the vehicle, it may be determined that a person has exited the vehicle.

When the weight has increased or reduced, it may be determined that a person has boarded or alighted from the vehicle by referring to stoppage information, or door opening and closing information (e.g., when the weight on a seat has increased without stoppage or opening and closing of a door, it may be determined that an item, not a person, may be put on the seat).

The weight may be stored before the weight has reduced, and when the weight increases after a predetermined period of time, the increased weight may be compared with the weight before reduction so as to determine a person has entered the vehicle. (For example, when the weight changes from 50 kg, the weight immediately after entering valet mode, to 30 kg, the weight estimated that an item may be dropped, and then to 50 kg, the weight before reduction, the object may be detected as an item, not a person. On the other hand, when the weight changes from 30 kg to 70 kg, which has increased by 40 kg from 30 kg, it may be detected that a person may be on board.)

When the driver's door may be opened and the weight on the driver's seat has reduced, and then another door may be opened within a predetermined period of time and the weight of the seat corresponding to the other door changes, it may not be determined that a person has entered the vehicle (e.g., when the driver returns to the driver's seat within a predetermined period of time, it may be determined that the driver has touched the item on the other seat).

Multi-person detection may be performed based on person boarding and alighting information.

Frequency of door opening and closing after starting valet mode

Change in vehicle mass estimate

Opening or closing of a door other than the driver's door

Opening or closing of a window other than the driver's window

Detecting sitting and whether a seat belt may be worn

Frequency of wearing a seat belt

Whether a rear seat (other than the driver's seat) air conditioning may be on

Whether the set air conditioning temperature may be lowered

Whether a speaker in the rear seat (other than the driver's seat) may be on

Whether a speaker volume may be raised

Whether heating/ventilating seats other than the driver's seat may be on

Utilization of rear seat notification system (radar sensor) signal

Frequency of stoppage (P-position or near 0 kph)

Next, the change controller 350 may be configured to perform one or more of the following when detecting movement or theft of an item or detecting boarding of multiple people in valet mode. The change controller 350 may be referred to as a control and notification portion 350.

Through Blue Link, the vehicle owner may not beified of movement or theft of an item or boarding of multiple people.

Through a warning display/alarm sound, the vehicle owner may not beified of movement or theft of an item or alighting of multiple people.

Vehicle departure may be restricted when multiple people may be detected.

Automatic vehicle locking may be performed when item theft may be detected.

When a person exits the vehicle after item theft may be detected, an alarm such as a horn may be sounded.

The process of limiting the eco-friendly vehicle by the valet control unit 300 according to an embodiment of the present disclosure described above depending on the weight change during the valet mode will be described as follows.

Figure 4:
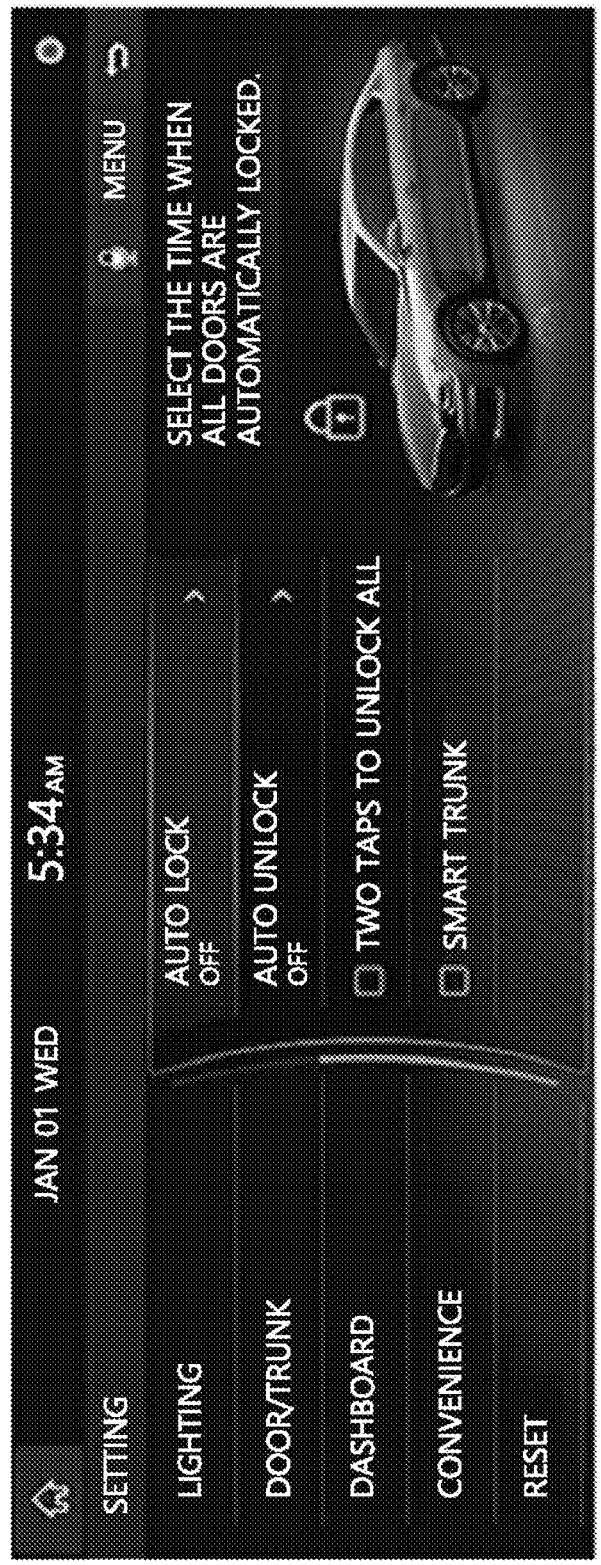
FIG. 4 illustrates an example of a form in which an eco-friendly vehicle is set to be limited by function during a valet mode according to another embodiment of the present disclosure.

FIG. 4 illustrates an example of a form in which an eco-friendly vehicle may be set to be limited by function during a valet mode according to another embodiment of the present disclosure.

Referring to FIG. 4, a user may access the user setting menu (USM) for the valet mode through a predetermined command input using an AVN system or the like.

For example, a user may access a menu for setting the limit of the eco-friendly vehicle in the user setting menu for the valet mode.

In each menu, a function to be currently set, a description of a function according to a set limit of an eco-friendly vehicle, and the like may be displayed.

Figure 5:
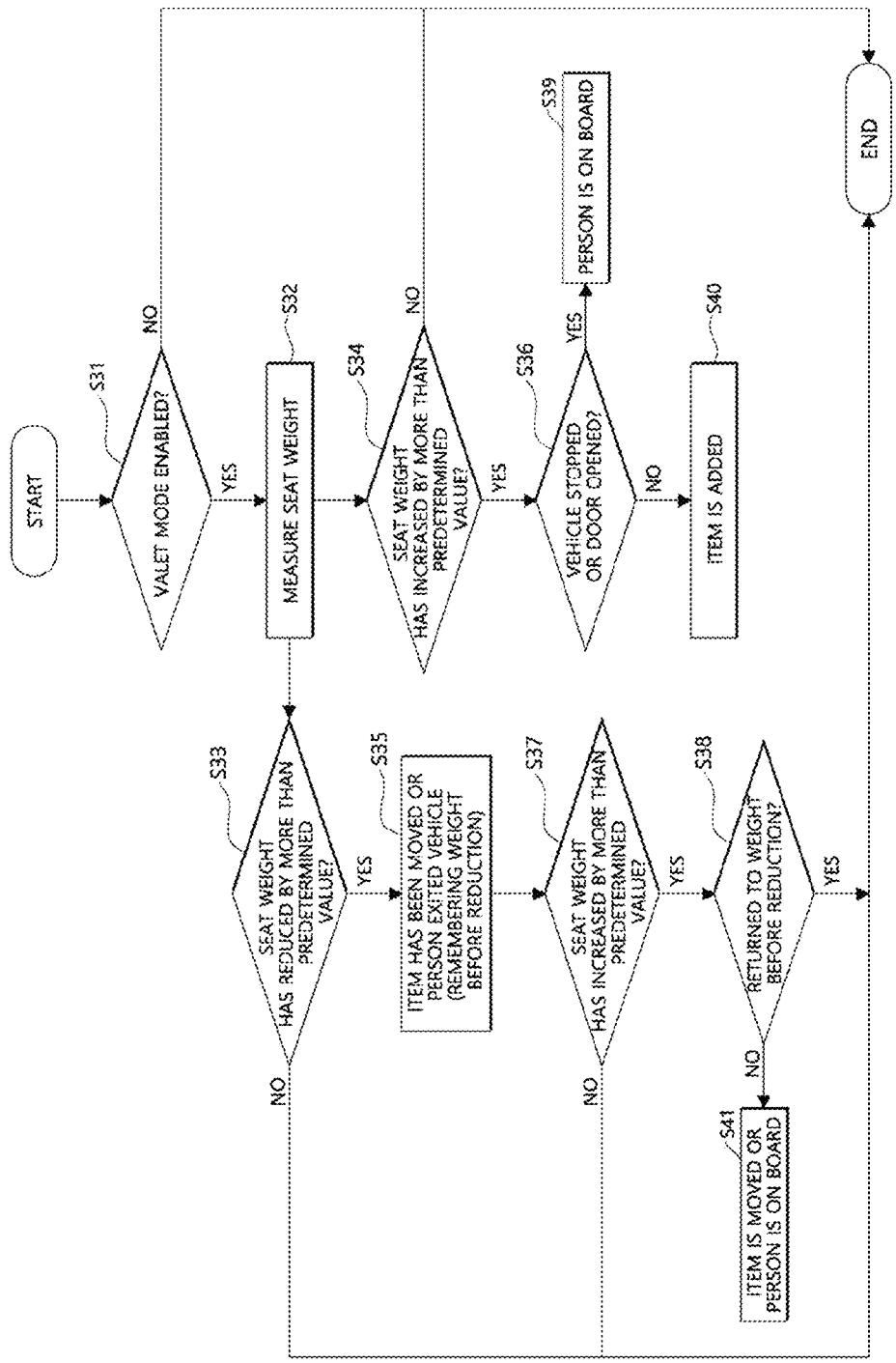
FIG. 5 is a flowchart showing an example of the control process for limiting the eco-friendly vehicle during the valet mode according to another embodiment of the present disclosure.

When the valet mode described so far may be activated, the control process for limiting the eco-friendly vehicle may be summarized as a flowchart in FIG. 5.

FIG. 5 may be a flowchart showing an example of the control process for limiting the eco-friendly vehicle during the valet mode according to another embodiment of the present disclosure.

Referring to FIG. 5, first, the valet control unit 300 may determine whether the conditions to enable valet mode are satisfied, and when the conditions are satisfied, the valet control unit 300 may activate the valet mode in step S31. A detailed description thereof has been described with reference to FIG. 3 and thus will be omitted herein.

When the valet mode is activated, the valet control unit 300 may measure a seat weight in step S32.

Thereafter, the valet control unit 300 may detect a change in the measured seat weight. In other words, when the measured seat weight has increased or reduced from a predetermined value, the valet control unit 300 may differently determine the weight in response to the increment or reduction of the weight in steps S33 and S34.

For example, the valet control unit 300 may determine that the measured seat weight has increased by more than a predetermined value in step S34. When the eco-friendly vehicle stops or a door operates (Yes in step S36), the valet control unit 300 may determine that a person has sat the seat, in which the weight thereof is measured, in step S39.

The valet control unit 300 may determine that the measured seat weight has increased by more than a predetermined value in step S34. When the eco-friendly vehicle does not stop or a door does not operate (No in step S36), the valet control unit 300 may determine that an item has been placed on the seat, in which the weight thereof is measured, in step S40.

In addition, when the valet control unit 300 determines that the measured seat weight has reduced by more than a predetermined value in step S33, it may be determined that an item has been moved or a person exited the vehicle in step S35. At this time, the valet control unit 300 may store the seat weight before reduction.

Thereafter, when the valet control unit 300 determines that the measured seat weight has increased by more than a predetermined value (Yes in step S37), the valet control unit 300 may compare the increased seat weight with the seat weight before reduction in step S38.

In other words, when the valet control unit 300 determines that the measured seat weight is not substantially the same as the seat weight before reduction as a result of the comparison (No in step S38), the valet control unit 300 may determine that an item has been moved in the eco-friendly vehicle or that a person has boarded again in step S41.

As described above, when the valet mode is activated, the present disclosure may detect a change in weight in an eco-friendly vehicle so as to determine whether an item has been moved, an item has been stolen, or multiple persons are boarded, under the control of the valet control unit 300, thereby restricting functions in the eco-friendly vehicle according to the result of the determination.

The present disclosure may notify the driver or the owner of the eco-friendly vehicle whether the eco-friendly vehicle is restricted depending on the result of the determination under the control of the valet control unit 300.

Figure 6:
FIG. 6 is a view showing an example of notification in which a plurality of persons are on board according to another embodiment of the present disclosure.

FIG. 6 is a view showing an example of notification in which a plurality of persons is on board according to another embodiment of the present disclosure.

Referring to FIG. 6, when valet mode is activated, the present disclosure may sense the weight using at least one or more indoor sensors, and based on the sensed weight, may determine whether a plurality of persons is on board.

In the present disclosure, when it is determined that a plurality of persons is on board when the valet mode is activated, this may be notified to a vehicle owner through Blue Link.

The present disclosure may place at least one or more restrictions on the eco-friendly vehicle depending on the selection of the vehicle owner. For example, the present disclosure may prohibit the departure of the eco-friendly vehicle or output a warning message when a plurality of persons has boarded in the valet mode. In some cases, the air conditioning system may be limited.

The present disclosure is not limited thereto, and when it is determined that an item in the eco-friendly vehicle has been stolen during the valet mode, the door and the window of the eco-friendly vehicle may be forcibly automatically locked and a warning sound may be output.

According to various embodiments of the present disclosure described above, the weight of an object riding in an eco-friendly vehicle may be sensed, and based on the sensed weight, excess seating capacity or overloading may be prevented.

In addition, according to various embodiments of the present disclosure, the weight of an object riding in an eco-friendly vehicle may be sensed, whether the weight of the object changes while driving or parking or stopping the vehicle may be determined based on the sensed weight, and the driving state or parking state of the vehicle may be controlled based on the determination to thereby more stably maintain the vehicle.

In addition, according to various embodiments of the present disclosure, when the weight of an item exceeds a predetermined vehicle reference weight in valet mode, it may be determined that a person in addition to the valet driver has boarded the vehicle and the function of the vehicle may be limited, thereby stably parking the vehicle.

In addition, according to various embodiments of the present disclosure, when the weight of an item exceeds a predetermined vehicle reference weight in valet mode, it may be determined that a person in addition to the valet driver has boarded the vehicle and the function of the vehicle may be limited, thereby improving fuel efficiency while improving reliability in valet mode.

In addition, according to various embodiments of the present disclosure, when the weight of an item has reduced from a predetermined vehicle reference weight in valet mode, whether an item in the eco-friendly vehicle has been stolen may be determined and a notification signal may be transmitted to the owner of the vehicle in response to the determination so as to relieve anxiety that may occur during the valet mode.

According to the present disclosure described so far, the weight of an object riding in an eco-friendly vehicle may be sensed, whether the weight of the object changes while driving or parking or stopping the vehicle may be determined based on the sensed weight, and the function of the vehicle may be restricted depending on the determination.

In the embodiments described so far, the level indexing expressed such as 1 to 3 may be merely an example and means that the control method and type change as the level changes. Therefore, it may be apparent to those skilled in the art that other expressions maintaining the meaning, such as A, B, C, D, or 4, 3, 2, 1, may be possible.

In addition, it goes without saying that two or more of the above-described levels may be integrated into one, or may be subdivided into lower levels depending on conditions within the same level.

Meanwhile, the present disclosure may be implemented as computer-readable code in program-recorded media. The computer-readable medium may include all types of recording devices each storing data readable by a computer system. Examples of such computer-readable media may include a hard disk drive (HDD), a solid state drive (SSD), a silicon disk drive (SDD), ROM, RAM, CD-ROM, magnetic tape, a floppy disk, an optical data storage element and the like. Accordingly, the above detailed description should not be interpreted as limiting in all embodiments, but should be considered as illustrative. The scope of the present disclosure should be determined by reasonable interpretation of the appended claims, and all changes within the equivalent scope of the present disclosure may be within the scope of the present disclosure.

What is claimed is:

1. A method of controlling a vehicle, the method comprising:
    generating weight objects in the vehicle using a plurality of indoor sensors disposed in the vehicle;
    performing comparative analysis on the generated weight of the objects with a predetermined vehicle reference weight; and
    differentiating limiting conditions for the vehicle or outputting a notification signal based on a result of the comparative analysis;
    wherein the generating comprises:
        when motion is detected from the objects, determining that the objects include one or more people riding in the vehicle and calculating a first weight for the one or more people;
        determining a second weight for one or more items among the objects for which motion is not detected; and
        generating the weight of the objects by using the first weight and the second weight,
    wherein the performing comprises:
        determining that a plurality of people have boarded the vehicle based on the weight of the objects, and
        blocking starting of the vehicle based on the determination that the plurality of people have boarded the vehicle.

2. A non-transitory computer-readable recording medium for recording a program for executing the method of controlling an eco-friendly vehicle according to claim 1.

3. The method according to claim 1, wherein the performing comparative analysis comprises:
    setting the predetermined vehicle reference weight differently in consideration of the first weight or the second weight,
    when the first weight in the generated weight of the objects is greater than the second weight, setting the predetermined vehicle reference weight based on a seating capacity, or
    when the second weight in the generated weight of the objects is greater than the first weight, setting the predetermined vehicle reference weight based on a load capacity.

4. The method according to claim 3, wherein the performing further comprises:
    when the generated weight of the objects is greater than the predetermined vehicle reference weight as a result of the comparative analysis, outputting a notification signal recognizable by a driver of the vehicle, and
    blocking starting of the vehicle by selection of the driver of the vehicle.

5. A method of controlling a vehicle, the method comprising:
    determining whether the vehicle is in a valet mode;
    when the vehicle is determined to be in the valet mode, generating a weight of objects in the vehicle using a plurality of indoor sensors disposed in the vehicle to obtain a generated weight of the objects;
    performing comparative analysis on the generated weight of the object with a predetermined vehicle reference weight; and
    differentiating limiting conditions for the vehicle or outputting a notification signal based on a result of the comparative analysis;
    wherein the generating comprises:
        in activation of the valet mode, when motion is detected from the objects, determining that the objects include one or more people riding in the vehicle and calculating a first weight for the one or more people;
        determining a second weight for one or more items amongst the objects for which motion is not detected; and
        generating the weight of the objects by using the first weight and the second weight;
    wherein the performing comprises:
        determining that a plurality of people have boarded the vehicle based on the weight of the objects, and
        blocking starting of the vehicle based on the determination that the plurality of people have board the vehicle.

6. The method according to claim 5, wherein the performing comprises:
    determining that the second weight has been changed, and
    when the second weight has reduced and then returned to the second weight before reduction, determining that the one or more items have been moved, and
    when the second weight has reduced and then not returned to the second weight before reduction, determining that the one or more items have been stolen.

7. The method according to claim 5, wherein the performing comparative analysis comprises:
    setting the predetermined vehicle reference weight differently in consideration of the first weight or the second weight,
    when the first weight in the generated weight of the objects: is greater than the second weight, setting the predetermined vehicle reference weight based on a seating capacity, or
    when the second weight in the generated weight of the objects is greater than the first weight, setting the predetermined vehicle reference weight based on a load capacity.

8. The method according to claim 7, wherein the performing comprises:
    when the weight of the objects is greater than the predetermined vehicle reference weight as a result of the comparative analysis, determining that the plurality of people have boarded the vehicle and outputting a notification signal recognizable by a driver of the vehicle, and blocking starting of the vehicle by selection of the driver of the vehicle.

9. A vehicle provided with a control unit for detecting weight change, wherein the control unit comprises:
   a calculator configured to:
      sense objects in the vehicle using a plurality of indoor sensors disposed in the vehicle, and
      generate a weight of the objects to obtain a generated weight of the objects;
   a determinator configured to perform comparative analysis on the generated weight of the objects with a predetermined vehicle reference weight; and
   a controller configured to differentiate limiting conditions for the vehicle or output a notification signal based on a result of the comparative analysis;
   wherein the calculator is configured to:
      when motion is detected from the objects, determine that the objects include one or more people riding in the vehicle and calculate a first weight for the one or more people,
      determine a second weight for the one or more items among the objects for which motion is not detected, and
      generates the weight of the objects by using the first weight or the second weight;
   wherein the performing comparative analysis comprises:
      generate the weight of the objects by using the first weight and the second weight;
      wherein performing the comparative analysis comprises:
         determining that a plurality of people have boarded the vehicle based on the weight of the objects, and
         blocking starting of the vehicle based on the determination that the plurality of people have boarded the vehicle.

10. The vehicle according to claim 9, wherein the determinator is configured to:
    set the predetermined vehicle reference weight differently in consideration of the first weight or the second weight:
    when the first weight in the generated weight of the object, is greater than the second weight, set the predetermined vehicle reference weight based on a seating capacity, or
    when the second weight in the generated weight of the objects is greater than the first weight, set the predetermined vehicle reference weight based on a load capacity.

11. The vehicle according to claim 10, wherein the controller is further configured to:
    when the weight of the objects is greater than the predetermined vehicle reference weight as a result of the comparative analysis, output a notification signal recognizable by a driver of the vehicle, and
    block starting of the vehicle by selection of the driver of the vehicle.

12. A vehicle provided with a valet control unit for controlling a valet mode, wherein the valet control unit comprises:
    a valet determinator configured to determine whether the vehicle is in the valet mode;
    a calculator, when the vehicle is determined to be in the valet mode, configured to sense objects in the vehicle using a plurality of indoor sensors disposed in the vehicle so as to generate a generated weight of the objects;
    a change determinator configured to perform comparative analysis on the generated weight of the objects with a predetermined vehicle reference weight; and
    a valet controller configured to differentiate limiting conditions for the vehicle or output a notification signal based on a result of the comparative analysis;
    wherein the calculator is configured to:
       in activation of the valet mode, when motion is detected from the objects, determine that the objects include one or more people riding in the vehicle and calculate a first weight for the one or more people,
       determine a second weight for the one or more items among the objects for which motion is not detected, and
       generate the weight of the objects by using the first weight and the second weight;
    wherein the performing comparative analysis comprises:
       determining that a plurality of people have boarded the vehicle based on the weight of the objects, and
       blocking starting of the vehicle based on the determination that the plurality of people have boarded the vehicle.

13. The vehicle according to claim 12, wherein the change determinator is configured to:
    set the predetermined vehicle reference weight differently in consideration of the first weight or the second weight:
    when the first weight in the generated weight of the objects is greater than the second weight, set the predetermined vehicle reference weight based on a seating capacity, or
    when the second weight in the generated weight of the objects is greater than the first weight, set the predetermined vehicle reference weight based on a load capacity.

14. The vehicle according to claim 13, wherein the valet controller is further configured to:
    when the weight of the objects is greater than the predetermined vehicle reference weight as a result of the comparative analysis, determine that the plurality of people have boarded the vehicle and output a notification signal recognizable by a driver of the vehicle, and
    block starting of the vehicle by selection of the driver of the vehicle.

15. The vehicle according to claim 12, wherein the valet controller is configured to:
    determine a change in the second weight, and
    when the second weight has reduced and then returned to the second weight before reduction, determine that the one or more items have been moved, and
    when the second weight is reduced and then not returned to the second weight before reduction, determine that the one or more items have been stolen.

* * * * *